July 7, 1953 F. MAILLARD ET AL 2,644,533
MEANS FOR STEERING AIRCRAFT WITH ROTARY WINGS
Filed March 30, 1948 2 Sheets-Sheet 2
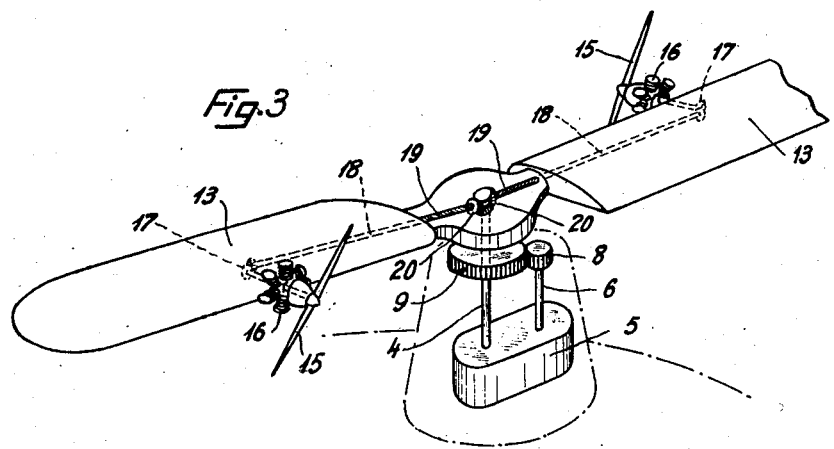
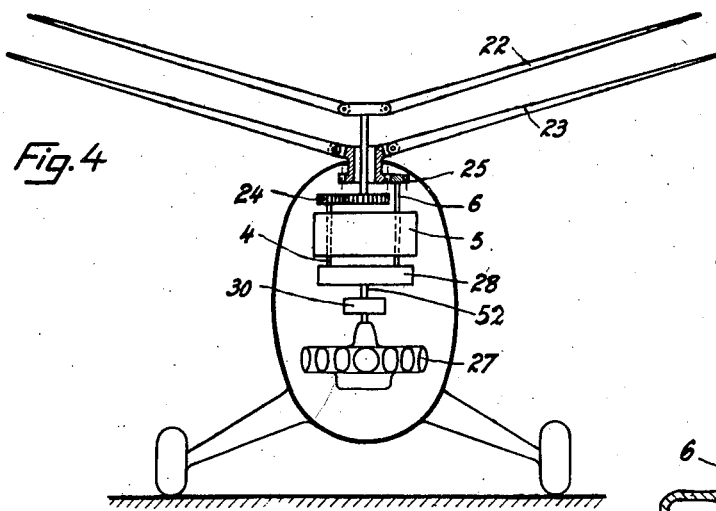
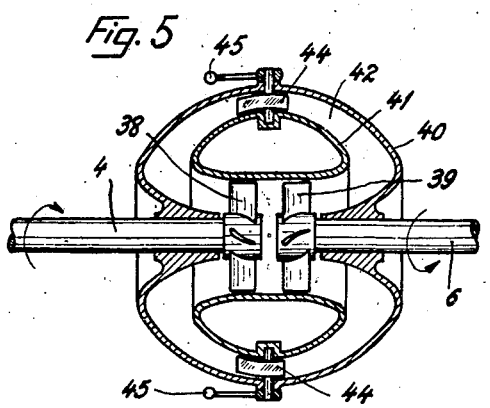
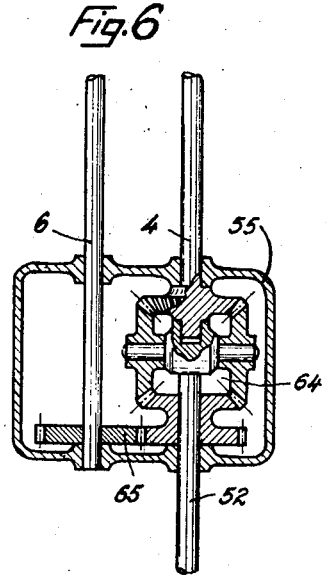
Francis Maillard,
André Laville
Jean Cantinieau
By Churchill, Rich, Weymouth & Engel
Attys.

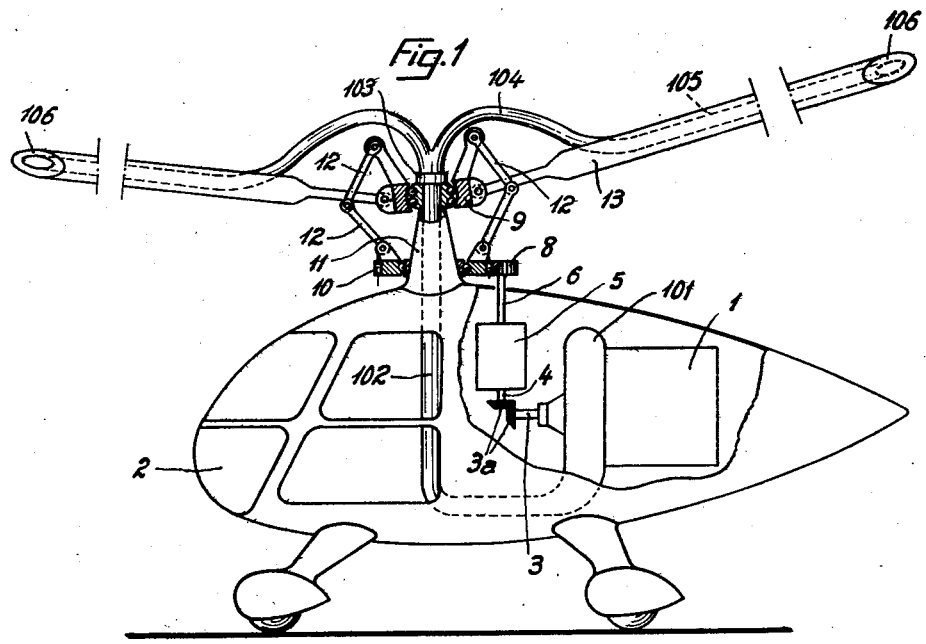
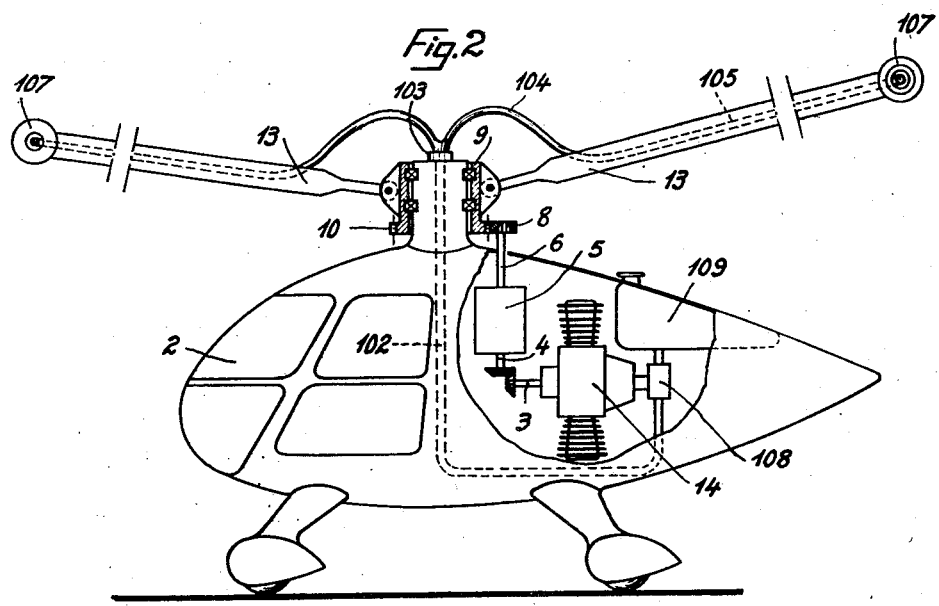

Patented July 7, 1953

2,644,533

UNITED STATES PATENT OFFICE 2,644,533

MEANS FOR STEERING AIRCRAFT WITH ROTARY WINGS

Francis Maillard, Issy-les-Moulineaux, André Laville, Fontenay-aux-Roses, and Jean Cantinieau, Paris, France, assignors to Societe Nationale de Constructions Aeronautiques des Sud-Ouest (Societe Anonyme), Paris, France, a company of France Application March 30, 1948, Serial No. 17,876
In France April 17, 1947

6 Claims. (Cl. 170—135.27)

Our invention has for its object a device for steering certain categories of helicopters or autogiros so as to provide an action that is independent of the translational movements of the machine without resorting to the operation of any control surface or auxiliary propeller projecting beyond the fuselage of the machine.

Our invention is not applicable to all categories of aircraft provided with rotary wings or a rotor, but chiefly to those wherein the rotor is adapted to turn freely about an axle associated with the fuselage, without requiring mechanical transmission of power from said fuselage, the movement of the wings or rotor being ensured through other means. This is the case of autogiros or helicopters, the rotor of which carries directly its propelling means such as reaction jet nozzles or airscrews as also of aircraft the blades of which are self-propelling and operate through a fluttering movement.

However our invention is also applicable to machines having an even number of rotors rotating in opposite directions, whether coaxial or otherwise, in all cases where the angular speeds of said rotors are not bound together by a transmission that constrains them to a predetermined constant ratio of rotation.

In other words, our invention is applicable to flying machines with rotary wings the rotation of which does not produce a reaction torque on the fuselage or again to those flying machines wherein the reaction torques are mutually balanced by the duality of propellers or propeller groups.

In such machines, it may be found as a matter of fact, that the yawing torque produced by the movement of the rotor is normally always low or even non-existent. It is therefore possible to merely use the action of control surfaces similar to those of airplanes. But the action of such surfaces is negligible at reduced speeds, this leads to a serious hindrance to maneuverability. It has been attempted to remove these drawbacks either by means of an airstream produced by a suitable fan or airscrew acting on the elevator or again by providing at a sufficient distance from the center of gravity of the machine an airscrew of adjustable pitch similar to the antitorque airscrews of helicopters with a single rotor and mechanical transmission, said airscrews being used in the vicinity of an average zero pitch.

The use of a control surface of the type used for airplanes cannot be retained in the case of a helicopter which requires an easy handling when holding the air at a stationary point. The other solutions referred to require a permanent expenditure of power that is not used for purposes of lift and propulsion of the machine. They require moreover control members located at a sufficient distance from the center of gravity of the machine, which increases the bulk and weight and furthermore, they are prejudicial to the streamlined shape of the machine while leading also to an objectionable sensitivity to the action of gales.

Our invention is based on the following remark:

If a torque tending to accelerate the movement of the rotor is transmitted mechanically from the stator to said rotor rotating freely on the said stator, the stator will have a tendency to rotate in the opposite direction and reversely, if the rotor is slowed down by a force bearing on the stator, the latter will have a tendency to be carried along by the rotor in the direction of rotation of said rotor.

Accordingly, the directional control according to our invention consists, in the case of a desired steering in one direction, in causing a certain mechanical energy to be transferred mechanically from a driving system, that may be rigid with the fuselage, to the lifting rotor and reversely with a view to an angular shifting of opposite direction to provide for the transmission of energy through the same channel from the rotor towards the driving system.

In order to allow an easy piloting, it is necessary for said transmission of energy to be a continuous one and for it to increase or diminish gradually in either direction. An embodiment allowing the execution of said method includes consequently, to advantage, a transmission connecting permanently the hub of a rotor with the driving system, said transmission allowing normally no transfer of energy but including means for constraining energy to pass in either direction. An arrangement of this type may be constituted by devices for the continuous change in speed of a known type. If it is supposed, as a matter of fact, that the transmission includes two shafts connected respectively with the hub of the rotor and with the driving system, said shafts being connected through the agency of a continuous speed varying device adjusted in a manner such that no energy can be transmitted through it, any modification of said adjustment will have a tendency to accelerate one of the shafts at the expense of the energy developed by the other. This provides for the transmission of energy sought for.

It is also possible to transform the energy developed by each shaft inside a device for generating reversible energy, while the two generators thus provided and preferably identical are mounted in opposite relationship in a channel allowing the passage in either direction of the energy thus generated.

The energy developed by such generators may assume various forms for instance that of an electric current or of static or dynamic energy stored in a fluid.

Different contrivances may allow acting on the channel connecting the two generators so as to provide for the passage of energy in the preferred direction so that the generator receiving energy may operate as the receiver and be accelerated thereby, while the other generator is braked.

This connection between the shafts of the rotor and of the driving system designed primarily as a speed modifying device or as reversible energy transformers arranged in opposition will be termed hereinafter a torque varying system.

In the particular case of two rotors rotating in opposite directions, the torque varying system is arranged between two shafts driving each one of the rotors. It is necessary that the transmission of movement ensuring a rotation of the two driving shafts does not prescribe a constant ratio of speed between the latter thus allowing the torque varying system to act through an acceleration of the speed of one shaft at the expense of the energy of the other. Consequently this transmission is of the equitorque type that allows, starting from a common driving shaft, transmitting to two shafts equal powers at different speeds. Such transmissions are well known per se and are used for instance for driving coaxial propellers, starting from a single motor.

The piloting device, according to the invention, has an efficiency that is independent of the speed of the aircraft and does not affect its shape. It does not lead to any loss of energy other than that due to the efficiency of the transmission and torque varying systems which only transmit moderate powers. As a matter of fact, the energy borrowed from the driving system is transmitted to the rotor and reversely the energy taken off the rotor may be recovered by the driving system and made use of for propelling the rotor. This is true only if the driving system located inside the fuselage supplies the rotor with the power required, with the understanding that this transmission of power is not provided under the form of mechanical rotary energy.

Our invention allows a very compact construction entirely enclosed inside the fuselage without any outer member detrimental to the outline of the aircraft or making the latter sensitive to outer disturbances.

Moreover, it is capable of providing without any modification for an arrangement for starting the autogiro rotors and helicopter rotors that are self-propelled through a method that is not capable of producing by itself the rotary speed required for starting the rotor; such for instance is the case of a rotor provided with a stator reaction jet system or with fluttering blades. Reversely, it may be substituted for the usual rotor brake or it may complete the action of the latter so as to obtain a stoppage of the rotor. Lastly, it provides a member on which the rate of the rotor may be measured more easily than on the hub itself.

The following description, with the accompanying drawings given by way of example and by no means in a limiting sense, will allow understanding how the invention may be executed, the features appearing both in the drawing and in the specification forming obviously part of said invention. In said drawings:

Fig. 1 is a lateral elevational view of a helicopter the rotor hub of which is angularly shiftable with reference to the pylon.

Fig. 2 is a similar elevational view of the helicopter the rotor hub of which cannot rock with reference to the pylon.

Fig. 3 illustrates a rotor driven in rotation by airscrews and the application of our invention to said particular case.

Fig. 4 shows diagrammatically in front elevational view a helicopter with two coaxial rotors.

Fig. 5 is a diagrammatic embodiment of a torque varying system acting through fluid operation.

Lastly Fig. 6 illustrates diagrammatically equitorque transmissions applicable to the embodiments illustrated in Fig. 4.

The helicopters illustrated in Figs. 1 and 2 are provided with a reaction jet sustaining rotor, i. e., a rotor mounted for free rotation relatively to the fuselage and driven by reaction jet propulsion.

In the case of Fig. 1, a rotary engine 1 located inside the fuselage 2, drives a compressor 101 discharging a gaseous fluid under pressure into a pipe 102 extending through the pylon 11 which constitutes the axle of the rotor and at the top of which there is provided a tight rotary joint 103. Flexible pipes 104 connect this joint to inner longitudinal ducts 105 extending along the blades 13 of the rotor and opening onto the atmosphere through conveniently directed outlets or nozzles 106.

The fluid under pressure issuing through these nozzles 106 in the form of a jet, gives rise to a reaction exerted on the blades and drives the latter in rotation. Clearly no reaction torque is produced on the fuselage, since the rotor is freely mounted on the pylon 11 and no mechanical power is supplied from the fuselage to the rotor.

This is also true in the case of the helicopter of Fig. 2. The blades 13 of the latter carry athodyds or ramjets 107 supplied with fuel through the piping 102, 103, 104, 105 by means of a pump 108 driven by an engine 14 located inside the fuselage, this fuel being stored in a tank 109.

The rotary engines 1 or 14 drive a shaft 3 geared at 3a to the primary shaft 4 of a torque varying system 5 (examples of which will be given hereafter) whose secondary shaft 6 bears a pinion 8 meshing with a toothed ring 10 associated to the hub 9 of the rotor.

In the helicopter of Fig. 1, the ring 10 is connected to the hub 9 which is mounted for oscillation about the pylon 11, through a set of driving pivoting arms or scissors 12 provided for driving purposes. The two shafts 4 and 6 allow removing respectively a fraction of the energy of the engine or of the rotor, as the case may be, to urge it through the torque varying system towards the rotor in the first case and towards the engine in the second case. During normal operation, that is during flight along a straight line, no power passes through the torque varying system, that is no transmission of power is provided either towards the engine or towards the rotor.

In the example illustrated, if a certain power is transmitted directly through the torque varying system 5 by the engine 1 towards the rotor, this increase of the rotary power obviously cooperates in the lift of the machine. It has been mentioned in the above introduction to the specification that in this case the machine assumes a shifting in direction that is opposed to the direction of rotation of the rotor. On the contrary, if power is removed from the rotor for transmission to the engine, that is for a shifting in a reverse direction, this power is not lost but made use of in the engine for instance for actuation of the compressor, so that it may be considered as indirectly cooperating in the lift. In either case, the power used for steering the machine is entirely recovered, neglecting of course the efficiency of the transmission.

In the helicopter of Fig. 2, the toothed ring 10 is integral with the hub 9 which cannot oscillate about the pylon 11. The operation and steering of this helicopter are carried out in a similar way to the above one.

Fig. 3 relates to a rotor including airscrews for ensuring its rotation. If the engine driving said airscrews is housed in the fuselage, the arrangement may be the same as in the case shown by way of example in Fig. 1. If on the contrary the engines controlling said propellers are carried inside the blades themselves, it is preferable to resort to the arrangement shown in Fig. 3. Each airscrew 15 driving the corresponding blade 13 is set rotating by a motor 16, each motor being provided with means for transmitting movement at 17 to a transmission system 18. The transmissions 18 from the two blades are associated through the agency of two further yielding transmissions or through a cardan joint 19 leading to bevel pinions 20 so as to drive a shaft connected with the primary shaft 4 of the torque varying system 5 fixedly mounted in the fuselage. As precedingly, the secondary 6 of said torque varying system is connected through a speed reducer 8 with the hub 9 of the rotor. As precedingly, it is possible as desired to transfer through the torque modifying system 5 energy from the motors 16 directly towards the hub of the rotor or reversely from the hub towards said motors.

Obviously also, in this case, there is a recovery of energy as the power removed from the kinetic energy of the rotor for steering into the desired direction is transmitted to the propellers while reversely, for obtaining rotation in the other direction, the power of the motors 16 is transmitted by the speed reducer 8 to the rotor, which has a tendency to accelerate the latter.

In the case of two coaxial rotors as illustrated in Fig. 4, each rotor 22 or 23 is provided with a speed reducing gear meshing with a driving member 24 or 25, which two latter driving members are connected through the torque varying system 5 including the primary 4 and secondary 6. The movement may be transmitted to said rotor by an engine 27 through a transmission 28 and said speed reducers 24 and 25 but it is important, for the torque varying system to be capable of acting as desired, that the transmission 28 should not introduce an invariable speed ratio between the two rotors. It would not be possible in such a case to accelerate one of the rotors at the expense of the energy of the other. The transmission 28 is that of the equi-torque type of which the Fig. 6 to be disclosed hereinafter provide an embodiment.

It is of advantage with a view to allowing self-rotation of the wings to provide in the case of Fig. 4 a clutch 30 in the shaft 52 between the equi-torque transmission and the engine.

Fig. 5 illustrates a torque varying system constituted by two turbines operating with fluids, adapted to rotate in opposite directions and mounted in a manner such that no power is transmitted normally from one turbine to the other while it is possible as and when required to provide through the agency of said fluid for such a transfer of power from one turbine to the other.

To the primary shaft 4 and to the secondary shaft 6 are keyed respectively the turbine wheels 38 and 39 enclosed inside a common casing 40. A stationary core 41 arranged centrally inside said casing defines a tore shaped circuit 42 defining the circulation of the fluid that during normal operation flows freely. Said circuit includes adjustable blades 44 actuated by a common control member 45 and allowing the fluid to receive a general rotary movement round the axis of the turbines.

If, for instance, the angular setting of the adjustable blades 44 causes the fluid to move in the same direction as the turbine 38, this movement cooperates in driving the turbine 38 and brakes consequently the turbine 39 that rotates in the opposite direction and should then provide alone the power required for the fluid circulation. Reversely, if the adjustable blades are set in the opposite direction, the turbine 38 is braked and provides the power to be recovered by the turbine 39.

An equivalent result may be obtained without acting on the blades 44 if one of the turbines 38 or 39 has an adjustable pitch. In this case, if the pitch of the turbine 39 is reduced for instance, it brakes the fluid circulation that is kept up by the turbine 38 so as to recover consequently the power provided by the latter. Reversely if its pitch is increased, the turbine 39 becomes the driving turbine and 38 the driven turbine. It is not necessary in such a case for the turbines to rotate in opposite directions and it is possible to make the system work in open circuit conditions in communication with the outer atmosphere with the omission in such a case of the tore shaped circuit and adjustable auxiliary blades.

Further arrangements of hydraulic power generators arranged in opposite relationship may also be used.

As mentioned in the description with reference to Fig. 4, it is essential that an equi-torque transmission may allow the two rotors driven simultaneously by the same motor to receive equal powers without them being bound to assume speeds the ratio between which is constant. Fig. 6 illustrates an example of such a transmission where the driving shaft 52 provides for rotation in opposite directions of the two receiver shafts 4 and 6, the transmissions being enclosed in a casing 55.

In the case of Fig. 6, a sun and planet differential system 64 incorporating bevel wheels the number of teeth of which is the same for all, is provided for connecting the shaft 52 with the shaft 4 while an auxiliary gear 65 provides for transmission of energy between the differential system and the second shaft 6. It is found that the torque transmitted to each of the driven shafts 4 and 6 is equal to one half of that applied to the driving shaft and the average of their speeds is equal to the speed of the driving shaft. This transmission provides thus as precedingly, but without any reduction in speed for equality between the torques transmitted to driven shafts.

What we claim is:

1. In a rotary wing aircraft having a fuselage and at least one sustaining blade-carrying rotor arranged outside said fuselage for rotation relatively thereto, the combination of power generating means for driving said rotor, a rotary shaft driven by said rotor and carried by said fuselage, a further rotary shaft carried by said fuselage, means for driving said latter-mentioned shaft in independent rotation relatively to the former-mentioned shaft, and variable ratio connecting means between said shafts for adjusting the relative velocities thereof, whereby energy is transferred at will from any one shaft to the other through the connecting means.

2. In a rotary wing aircraft having a fuselage and one sustaining blade-carrying rotor arranged outside said fuselage for free rotation about an axle secured thereto, the combination of propelling means on the blades of said rotor for driving same, a rotary shaft driven by said rotor and carried by said fuselage, a further rotary shaft carried by said fuselage, a source of power for driving said latter-mentioned shaft in independent rotation relatively to the former-mentioned shaft, and variable ratio connecting means between said shafts for adjusting the relative velocities thereof, whereby energy is transferred at will from any one shaft to the other through the connecting means.

3. In a rotary wing aircraft having a fuselage and one sustaining blade-carrying rotor arranged outside said fuselage for free rotation about an axle secured thereto, the combination of jet nozzles on the blades of said rotor, a source of fluid under pressure in said fuselage, piping means between said source and said nozzles, a rotary shaft driven by said rotor and carried by said fuselage, a further rotary shaft carried by said fuselage, a source of power for driving said latter-mentioned shaft in independent rotation relatively to the former-mentioned shaft, and variable ratio connecting means between said shafts for adjusting the relative velocities thereof, whereby energy is transferred at will from any one shaft to the other through the connecting means.

4. In a rotary wing aircraft having a fuselage and one sustaining blade-carrying rotor arranged outside said fuselage for free rotation about an axle secured thereto, the combination of ramjets at the tips of the blades of said rotor, a source of fuel under pressure in said fuselage, piping means between said source and said ramjets, a rotary shaft driven by said rotor and carried by said fuselage, a further rotary shaft carried by said fuselage, a source of power for driving said latter-mentioned shaft in independent rotation relatively to the former-mentioned shaft, and variable ratio connecting means between said shafts for adjusting the relative velocities thereof, whereby energy is transferred at will from any one shaft to the other through the connecting means.

5. In a rotary wing aircraft having a fuselage and one sustaining blade-carrying rotor arranged outside said fuselage for free rotation about an axle secured thereto, the combination of airscrews with individual engines on the blades of said rotor for driving same, a rotary shaft driven by said rotor and carried by said fuselage, a further rotary shaft carried by said fuselage, a gearing between said airscrews and said latter-mentioned shaft for driving same in independent rotation relatively to the former-mentioned shaft, and variable ratio connecting means between said shafts for adjusting the relative velocities thereof, whereby energy is transferred at will from any one shaft to the other through the connecting means.

6. In a rotary wing aircraft having a fuselage and two coaxial sustaining blade-carrying rotors arranged outside said fuselage for rotation relatively thereto, the combination of power generating means for driving said rotors in opposite directions with velocities independent from one another, two rotary shafts carried by said fuselage and respectively driven by said rotors, and variable ratio connecting means between said shafts for adjusting the relative velocities of said rotors, whereby energy is transferred at will from any one rotor to the other through the connecting means.

FRANCIS MAILLARD.
ANDRÉ LAVILLE
JEAN CANTINIEAU.

References Cited in the file of this patent

UNITED STATES PATENTS

| Number | Name | Date |
|---|---|---|
| 1,669,758 | Isacco | May 15, 1928 |
| 1,673,232 | De la Cierva | June 12, 1928 |
| 1,893,395 | Breguet | Jan. 3, 1933 |
| 1,994,488 | Sikorsky | Mar. 19, 1935 |
| 2,084,464 | Stalker | June 22, 1937 |
| 2,330,056 | Howard | Sept. 21, 1943 |
| 2,337,570 | Pullin | Dec. 28, 1943 |
| 2,394,513 | De Chappedelaine | Feb. 5, 1946 |
| 2,429,646 | Pullin | Oct. 28, 1947 |
| 2,472,917 | Nicolaeff | June 14, 1949 |

OTHER REFERENCES

Basic Drive for Helicopters, published in "Aviation," November 1944, pages 125–133. A copy may be found in Division 9 of the U. S. Patent Office.